March 19, 1968   S. J. MARWIL ET AL   3,374,211

SOLIDS RECOVERY FROM A FLOWING STREAM

Filed July 27, 1964

INVENTORS
S. J. MARWIL
R. G. WALLACE

BY *Young & Quigg*

ATTORNEYS

United States Patent Office 3,374,211
Patented Mar. 19, 1968

3,374,211
SOLIDS RECOVERY FROM A
FLOWING STREAM
Stanley J. Marwil, Bartlesville, Okla., and Robert G. Wallace, Tokyo, Japan, assignors to Phillips Petroleum Company, a corporation of Delaware
Filed July 27, 1964, Ser. No. 385,423
2 Claims. (Cl. 260—88.2)

ABSTRACT OF THE DISCLOSURE

Removal of settled polymer from a polymerization system in a concentrated state without objectionable string formation is provided by (1) reducing the jacket coolant temperature on the settling leg by employing high coolant flow rate and low temperature difference between the coolant and the slurry; (2) providing a product settling zone having a predetermined length to internal diameter ratio; (3) providing a controlled pressure drop across the product discharge valve at the lower end of the settling leg of 20 to 45 p.s.i.g.; (4) using an instantaneous back pressure on the downstream side of the discharge valve of 100 to 200 p.s.i.g.; and (5) utilizing in the settling leg a heated flush medium to prevent precipitation of soluble polymer and to decrease the monomer solubility therein.

---

Figure 1:
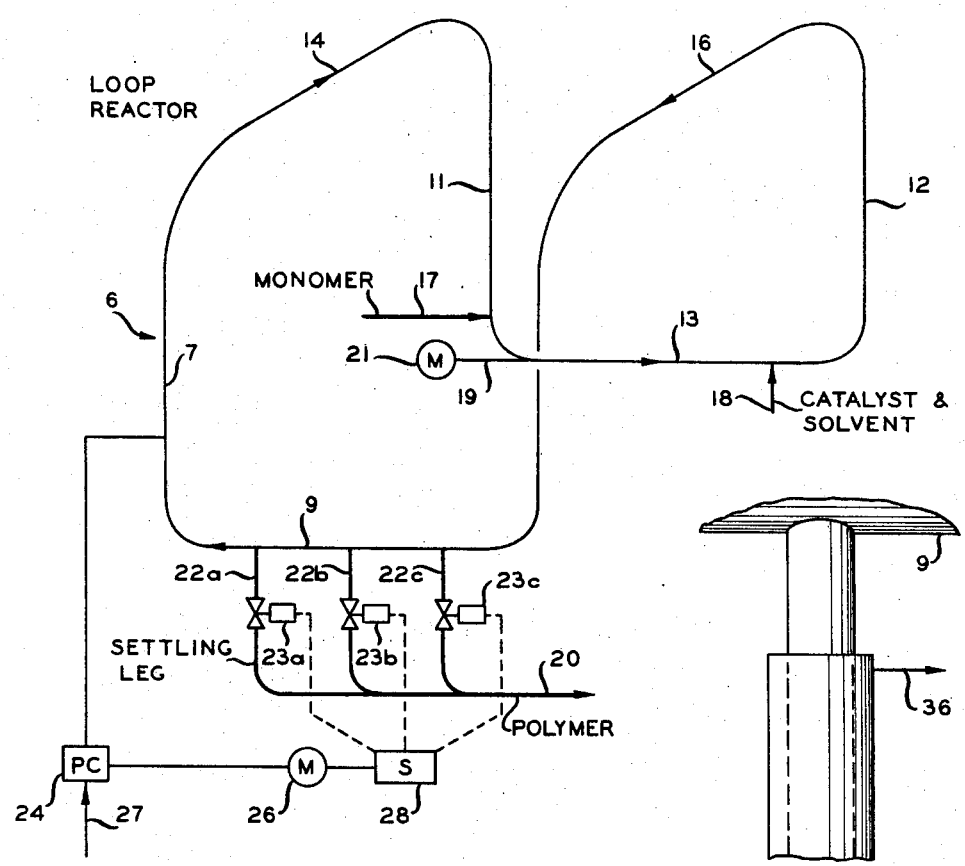

This invention relates to the withdrawal of solids from a flowing stream comprising a slurry of such solids. In another aspect it relates to a method and apparatus for withdrawing solids, such as particle-form polymer, from a flowing stream comprising a slurry of such solids, for example a stream of polymerization mixture continuously flowing in a polymerization loop reactor.

In many industrial processes a slurry of solids and liquid is passed in a flowing stream through a horizontal pipe or the like, often at high velocity and turbulence, and a fraction of the solids is gravitationally drawn off by means of a depending pipe or the like. For example, in the polymerization of 1-olefins to produce particle-form polymer in a tubular closed loop reactor where a slurry of solid particle-form polymer and liquid hydrocarbon diluent flows in a continuous path in a highly turbulent flow range, settling legs or draw-off pipes are attached to the lower horizontal section of the loop reactor to gravitationally draw off a concentrated fraction of the solid polymer. However, in the operation of such gravitationally operated settling legs or draw-off pipes, difficulty has been experienced heretofore in the operation thereof due to the formation of rope-like strands of polymer therein which result in plugging of the settling leg and transfer lines from the leg to polymer driers. Another difficulty which has been experienced in the operation of these settling legs is the formation of fibrous strings of polymer which result in the plugging of the polymer drier as well as various valves downstream of the reactor. Such problems are highly undesirable in the operation of a polymerization system since the plugging of the lines results in the shutdown of the plant operation or the necessity of dumping product where the process is otherwise continuous during such time as required to remedy the disrupting condition in the process. Thus, it is apparent that a process and apparatus which would avoid the plugging either of the settling leg, the transfer liner, driers or of other valves and lines would produce a greatly improved process for which there is a great need. Thus, there has arisen a need for improved method and apparatus for the withdrawal of solids from such a system.

Accordingly, an object of the present invention is to provide an improved method for the withdrawal of solids from a flowing stream comprising a slurry of same. Another object of the invention is to provide an improved method and apparatus for withdrawing solids, such as particle-form polymer, from a flowing stream comprising a slurry of same, for example the polymerization reaction mixture continuously circulated in a polymerization loop reactor. Another object is to provide an improved method and apparatus for concentrating settled solids drawn off from a flowing stream comprising the same.

Figure 2:
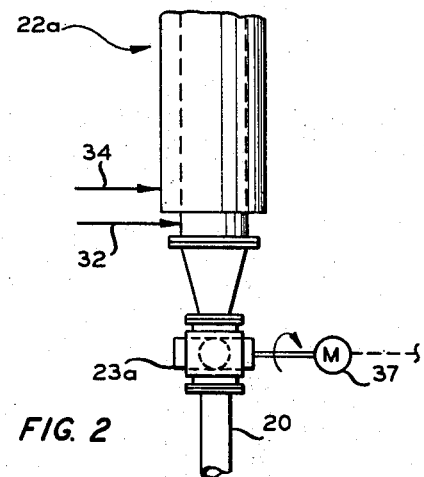

Other objects, aspects and the several advantages of this invention will become apparent to those skilled in the art from the following discussion, the appended claims, and the drawings in which:

FIGURE 1 is a schematic flow sheet of a tubular loop reactor with features of this invention associated therewith; and FIGURE 2 is an elevational view in section of a portion of FIGURE 1 showing details of this invention.

In accordance with the present invention we have discovered that in a system in which solids are allowed to gravitate from a horizontally flowing stream comprising a slurry of such solids in a liquid and to flow into a depending solids settling zone from which a concentrated slurry of solids is periodically withdrawn, there is provided an improved method and apparatus for removing the settled discharge from the settling leg by (a) reducing the jacket coolant temperature on the settling leg in such a manner that high coolant flow and low $\Delta T$, temperature difference between coolant in jacket and slurry in settling leg, cooling are provided therein, (b) providing a controlled pressure drop for product discharge from the settling leg, (c) providing a product discharge line so as to supply instantaneous back pressure on the downstream side of the product discharge valve, and (d) providing a settling leg having a predetermined length to internal diameter ratio. In addition, it has also been found in accordance with the present invention that by heating the liquid medium utilized to flush the settling leg, the formation of plugging strands is also avoided. Further in accordance with this invention, it was found that providing an increased heat exchange area within the settling leg likewise aids in the avoidance of plugging in the system.

Our invention finds particular application in gravitationally withdrawing concentrated solid particle-form polymer from a tubular closed loop reaction zone in which is continuously circulated at high velocity a slurry comprising said polymer, liquid diluent in which a substantial amount of the polymer is insoluble (e.g., 60 to 99 percent), catalyst and hydrocarbon reactant and this invention will be illustrated in connection with such a process. However, it should be understood that the invention is not to be limited thereto, since it will find application wherever it is desired to gravitationally withdraw particulate solids from a flowing stream comprising a slurry of such solids.

Referring now to the drawing and initially to FIGURE 1, there is shown a tubular loop reactor, generally indicated 6, which can be made in the form of two loops, one loop comprising two vertical pipe sections 7 and 8, communicating at the lower ends by way of a horizontal pipe section 9. The other loop similarly comprises two vertical pipe sections 11, 12, the lower ends of these pipe sections connected together via a horizontal pipe section 13. The upper ends of the vertical pipe sections of the two loops are connected by horizontal pipe sections 14 and 16. Portions or all of the reactor 6 can be insulated and provided with a cooling jacket or the like. Reactor 6 thus provides a continuous path in which there is circulated the reactor-full slurry of particulate-form polymer and liquid diluent, depending upon the reactants and reaction conditions. A conduit 17 can communicate with the lower end of one of the vertical pipe sections 11 to supply the reactor 6 with a polymerizable compound such as ethylene, and another conduit 18 can communicate with the horizontal section 13 of the same loop to supply the reactor with a stream of catalyst and liquid diluent such as pentane. The reactor 6 is operated "liquid full" and under pressure, and the flow of the polymerization reaction mixture can be maintained at a high velocity sufficient to maintain the solids in suspension, e.g., in a highly turbulent flow range, at a Reynolds number of 1 million to 35 million, or higher, by provision of an internal propeller or the like driven by shaft 19 connected to a suitable motive source, such as a steam-driven turbine 21, the rotational energy of the propeller being converted into flow energy.

Depending from horizontal pipe section 9 of loop reactor 6 are one or more settling legs, for example three legs 22a, 22b, 22c, which can be welded to pipe 9 or otherwise affixed thereto, the inlet ends of these settling legs communicating with the interior of pipe 9, and the outlet ends of these settling legs being connected to a discharge line 20. The settling legs should have a length to internal diameter ratio within the range of 12:1 to 15:1, and preferably within the range of 12.5 to 13.5:1. Portions or all of these settling legs can be insulated and provided with a cooling jacket or the like. Suitable flow control valves 23a, 23b, and 23c, such as solenoid-operated valves or the like, are provided in the settling legs 22a, 22b and 22c, respectively. These flow control valves can be controlled to periodically open at predetermined frequencies and sequence to permit the discharge of the slurry of concentrated settled particle-form solids which accumulate in the portions of the settling legs upstream of these valves. For example, a suitable pressure controller 24 can be connected to the reactor so as to vary the speed of a variable speed motor 26 whenever the pressure in the reactor reaches a predetermined set point 27 to pressure controller 24. The variable speed motor 26 can vary a conventional sequence controller 28, which is operatively connected to the flow control valves in the settling legs. Thus for example, when the pressure in the reactor reaches that desired pressure previously introduced as the set point to the pressure controller 24, one or more of the valves 23a, 23b and 23c are opened either simultaneously or in sequence until a decrease in pressure is reached in the reactor, which in accordance with this invention is within the range of 20 to 45 p.s.i.g. and preferably 25 to 30 p.s.i.g. for a 4-inch leg and 35 to 40 p.s.i.g. for a 6-inch internal diameter leg. The slurry of concentrated solids is thereby discharged from the reactor settling leg until such a desired decrease in pressure has taken place in the reactor, at which time the pressure controller 24 causes the activation of variable speed motor 26 which closes the valves until such time as the predetermined pressure is again built up within the reactor. One of the valves is open for about 0.1 second. The valve is then closed for about one minute. The slurry of concentrated solids, e.g. 50 weight percent solids, in discharge line 20 can then be passed to suitable polymeric recovery equipment, for example a flash tower, for the removal of diluent and unreacted reactants.

In FIGURE 2 I have illustrated in detail settling leg 22a connected to the horizontal pipe section 9 of the loop reactor 6 of FIGURE 1. According to one embodiment of this invention there is provided a circumferentially spaced jacket 30 around the leg 22 which is so adapted as to provide for introduction of a coolant medium through conduit 34 at a high rate as to remove sufficient heat at a low ΔT. Valve 23a in communication with the lower end of leg 22a is operated by motor 37 so adapted as to be responsive to the internal pressure within the reactor loop and is provided to allow for a decrease in pressure in the reactor of between 20 to 40 p.s.i.g. depending upon the internal diameter of the settling leg. The coolant medium is removed by means of conduit 36. In addition, conduit 20 is so sized as to provide an instantaneous back pressure of 100 to 200 p.s.i.g. on the downstream side of the product discharge valve 23a. A pressure of 150 p.s.i.g. is preferred. Conduit 32 is so adapted as to communicate with the inner portion of the settling leg 22a at the lower end thereof to provide a heated flush medium into the settling leg so as to prevent precipitation of soluble polymer and to decrease the ethylene solubility therein. Preferably a temperature of 190 to 200° F. is desired for the flush medium.

As previously mentioned, this invention finds particular applicability in connection with the production of particle-form polymer in a tubular loop reactor. For example, polymerization of one or more olefins can be carried out in the modified reactor of this invention according to the process disclosed in U.S. Patent No. 2,825,721 of Hogan et al., to produce polymers and copolymers, utilizing a catalyst comprising as an essential ingredient chromium oxide, preferably including a portion thereof in the hexavalent form. In addition, other catalyst systems such as organometal catalysts can be employed for the polymerization catalyst in the reactor system. The olefin feed used for the polymerization is at least one olefin selected from 1-olefins having a maximum of 8 carbon atoms per molecule and no branching nearer the double bond than the 4-position. Examples of such olefins are ethylene, propylene, 1-butene, 1-pentene and 1,3-butadiene and mixtures thereof. Such olefins can polymerized in the presence of a hydrocarbon diluent, for example, an inert acyclic, alicyclic or aromatic compound such as normal pentane, normal butane, isobutane, normal hexane, normal decane, cyclohexane, cyclopentane, methylcyclopentane, methylcyclohexane and the like. The preparation of insoluble particle-form polymer which is preferred is that disclosed in the copending application of Leathermann et al., Ser. No. 590,567, filed June 11, 1956.

The objects and advantages of this invention are further illustrated in the following example, but it should be understood that the various conditions, reactants and other details of this example should not be construed to limit the invention unduly.

*Example*

A copolymer of ethylene and butene-1 is prepared by polymerization of these monomers in a loop reactor as illustrated in FIGURE 1. Such a reactor has a capacity of 2650 gallons and an inner diameter of 15 inches and is operated at 210° F. and 150 p.s.i.g. To this reactor are fed 1022 lbs./hr. of ethylene, 25 lbs./hr. butene-1, and 185 gallons/hr. pentane (including fresh and recycle with chromium oxide catalyst suspended therein). The concentration of ethylene in the loop reactor is maintained at 6.5 weight percent, that of butene-1 at 1.0 weight percent and that of the copolymer at 24 weight percent.

The loop reactor is provided with three settling legs as shown in FIGURES 1 and 2, each leg having an inner diameter of 4 inches and provided with a circumferentially spaced jacket. The legs are of a length sufficient that the ratio of length to internal diameter is in the range of 12:1 to 15:1.

During operation of the polymerization process, the valves in the settling leg are intermittently opened at staggered frequencies every 20 to 75 seconds in response to the pressure within the reactor so as to provide a pressure decrease of approximately 25 pounds in the reactor. Generally the valves are open for 0.1 to 0.2 second. The concentrated slurry of polymer (having a high load melt index ASTM D-1238-52T of 1.6) is thus withdrawn from the settling leg with a polymer concentration of 49.5 weight percent.

Various modifications of this invention can be made, or followed, in view of the foregoing, without departing from the spirit or scope thereof.

We claim:
1. In a polymerization system wherein polymer solids are allowed to gravitate from a horizontally flowing stream comprising a slurry of such solids in a liquid and to flow into a depending solids settling zone from which a concentrated slurry of solids is periodically withdrawn, an improved process for removing polymer from said settling zone which comprises (a) reducing the jacket coolant temperature on the settling leg in such a manner that high coolant flow and low temperature difference between coolant in said jacket and slurry in said settling zone are provided; (b) providing a controlled pressure drop within the reactor for product discharge from the settling leg within the range of 20 to 45 p.s.i.g.; (c) providing instantaneous back pressure on the downstream sides of the product discharge valve within the range of 100 to 200 p.s.i.g.; (d) utilizing a settling zone having a length to internal diameter ratio in the range of 12:1 to 15:1; and (e) utilizing a heated flush medium in said settling zone so as to prevent precipitation of soluble polymer and to decrease the ethylene solubility therein.

2. A process according to claim 1 wherein said heated flush medium is at a temperature in the range of 190 to 200° F.

References Cited
UNITED STATES PATENTS 3,242,150   3/1966   Scoggin _____ 260—88.2
3,257,363   6/1966   Miller _____ 260—94.9

JOSEPH L. SCHOFER, *Primary Examiner.*

L. EDELMAN, F. L. DENSON, *Assistant Examiners.*